United States Patent [19]

Czuba

[11] 4,182,283

[45] Jan. 8, 1980

[54] COMBUSTION CHAMBER AND PISTON THEREFOR

[76] Inventor: Boleslaw J. Czuba, 6256 Mitchell, Detroit, Mich. 48211

[21] Appl. No.: 870,353

[22] Filed: Jan. 18, 1978

[51] Int. Cl.² ............................................. F02B 59/00
[52] U.S. Cl. ................................. 123/50 R; 123/50 A; 123/193 CP; 123/193 P
[58] Field of Search ................... 123/50, 32 C, 193 R, 123/193 P, 193 H, 193 CH; 92/107, 172

[56] References Cited

U.S. PATENT DOCUMENTS

| | | | |
|---|---|---|---|
| 1,262,457 | 4/1918 | Conrad | 123/193 R |
| 1,314,716 | 9/1919 | Strebler | 123/50 R |
| 2,786,458 | 3/1957 | Luttrell | 123/50 R |
| 3,969,894 | 7/1976 | Bachmann | 123/193 CP |

FOREIGN PATENT DOCUMENTS

| | | | |
|---|---|---|---|
| 546537 | 2/1932 | Fed. Rep. of Germany | 123/50 R |
| 1127314 | 12/1956 | France | 123/193 R |
| 124534 | 3/1919 | United Kingdom | 123/193 P |

Primary Examiner—Charles J. Myhre
Assistant Examiner—Craig R. Feinberg
Attorney, Agent, or Firm—Cullen, Sloman, Cantor, Grauer, Scott & Rutherford

[57] ABSTRACT

An improved combustion chamber and piston therefor, for an internal combustion engine of the type having a cylinder block and a cylinder head positioned thereabove and having pistons slideably mounted in suitable hollow cylinders in the cylinder block. The piston has a concave piston head defining a combustion cavity therein and the cylinder head extends downwardly into the piston head cavity so that combustion takes places solely within the piston head cavity. During the piston power stroke, the expanding combusted fuel exerts force on the piston head but not on the cylinder walls.

5 Claims, 2 Drawing Figures

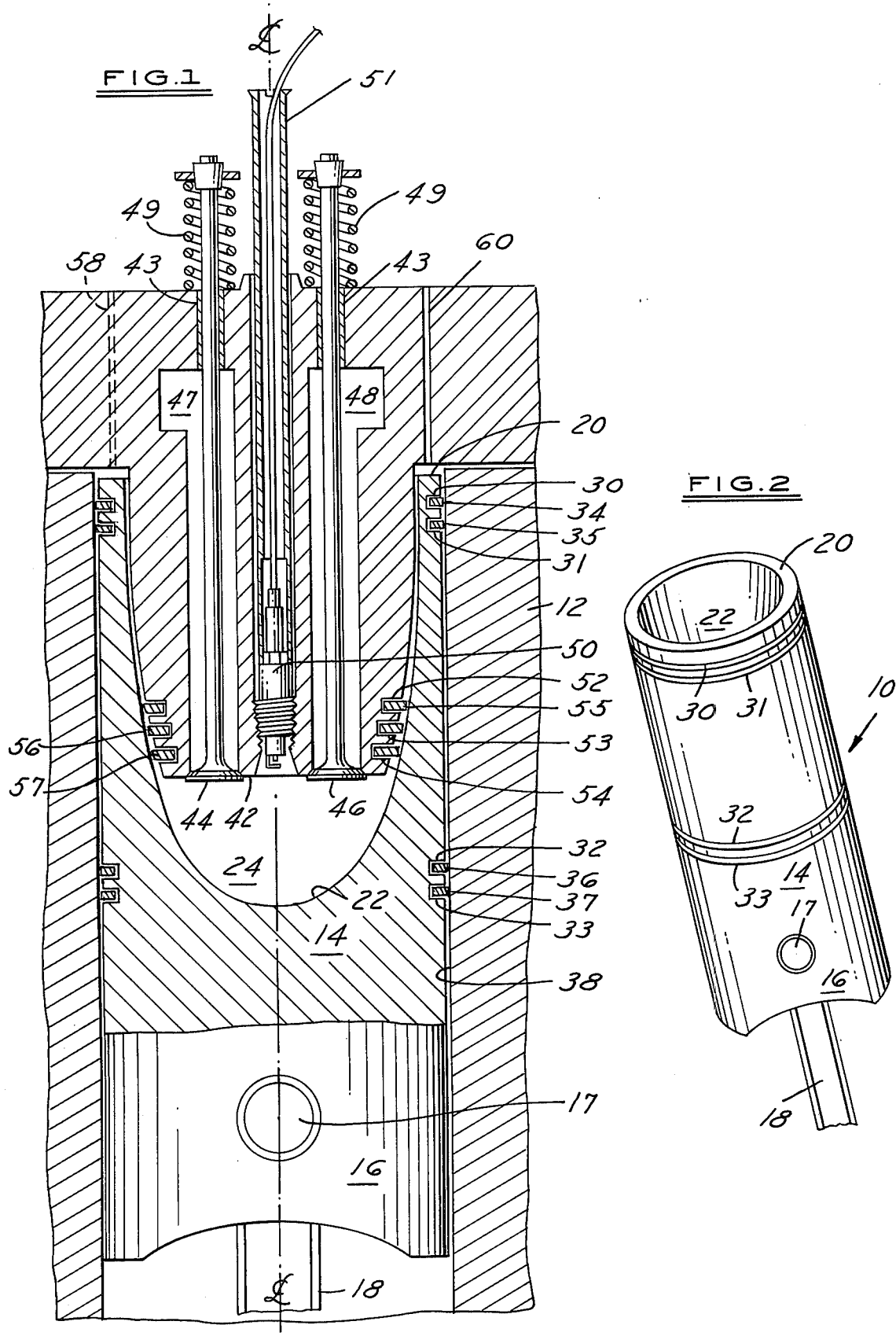

COMBUSTION CHAMBER AND PISTON THEREFOR

BACKGROUND OF THE INVENTION

The present invention relates in general to an improved piston and combustion chamber for an internal combustion engine.

Present day internal combustion engines have an efficiency in the range of 25 to 35 percent. The present invention seeks to overcome this relatively low efficiency by a novel approach to the combustion chamber itself.

For most efficient performance of an internal combustion engine, the principles set out by Beau do Rochas states that there are several criteria including (1) the smallest possible surface to volume ratio, i.e., the smallest or minimum cooling surface with the maximum cylinder volume; (2) a maximum rapidity of combustion; (3) a maximum ratio of expansion of the combusted gas and (4) a maximum possible pressure at the beginning of the expansion stroke. The present invention relates in particular to the first and fourth of these principles.

SUMMARY OF THE INVENTION

To overcome the relative inefficiencies of prior internal combustion engines, the present invention takes advantage of the well-known proposition that a gas confined in a chamber exerts an equal pressure on all the walls of the chamber.

Prior to the present invention, this elemental law of physics had not been utilized to the internal combustion engine with respect to the design of the combustion chamber and piston.

I have discovered that by a suitable configuration of the piston and combustion chamber, I can totally eliminate the combusted gases exerting any force on the cylinder walls since this is an unused pressure (or lost energy) becase it doesn't do any work.

Furthermore, by a unique design of the combustion chamber, during the power stroke or downstroke of the piston in response to the combustion of gases, as the volume of the gases expands thereby decreasing the pressure, per square inch, I provide a greater ratio of piston head surface area to total surface area upon which this pressure is exerted. This counteracts the decrease of pressure per square inch which normally occurs.

In a preferred embodiment of the present invention, the piston head has a concave configuration. The cylinder head, intake and exhaust valves and spark plug extend downwardly into the concave portion of the piston head so that combustion occurs within the cavity of the piston head. Because the combustion occurs within the cavity the combustion temperature is increased from a typical 500° F. to the 650° F. to 700° F. range according to this invention. This temperature increase results in better thermal efficiency, i.e., better combustion, as well as decreased pollution.

BRIEF DESCRIPTION OF THE DRAWINGS

The various objects and advantages of the present invention will become more apparent upon reading the detailed description of the invention taken in conjunction with the drawings.

In the drawings, wherein like numerals identify corresponding parts;

FIG. 1 is a diagrammatic elevational view, partly in section, of the piston and combustion chamber according to the principles of the present invention; and FIG. 2 is a perspective illustration of a preferred embodiment of a piston according to principles of the present invention.

DETAILED DESCRIPTION OF THE INVENTION

Referring first to FIGS. 1 and 2, a preferred embodiment of the present invention is illustrated including a piston 10 mounted for reciprocal movement within an engine or cylinder block 12. The piston 10 has a piston head 14, a skirt 16 and a piston pin 17 connecting the piston to a connecting rod 18 as is conventional.

Referring to the piston head 14, this is a generally concave configuration having an upper end 20 and a lower most portion 22 defining a cavity 24 therebetween.

As is conventional, the piston has a plurality of grooves circumferentially machined therein including grooves 30 and 31 at the upper end of the piston and grooves 32 and 33 intermediate the length of the piston. Conventional oil rings 34, 35, 36 and 37 are positioned in the grooves 30, 31, 32 and 33 respectively. These oil lubricating and oil scraper rings function in the normal fashion to lubricate the cylinder walls 38.

The overhead 40 according to the present invention, has a lower combustion surface 42 which extends downwardly into the combustion cavity 24 formed in the piston head thus being the reverse of the normal combustion chamber. Suitable holes 43 are bored through the cylinder overhead for the valve stem and valve guides. The inlet and outlet ports 47, 48, respectively, in the overhead lead to the combustion chamber or cavity and will be cast iron, while the seats for the valves 44, 46, will be machined. At the upper end of each of these valves a spring 49 is provided for regulating the movement of the valves under the influence of a cam as is conventional.

A spark plug 50 is positioned at the lower end of the cylinder overhead adjacent the cavity 24 in the piston head. The plug is threaded, at its lower end, as is conventional and the plug is threaded into a conventional threaded hole in the cylinder overhead. However, since there is a considerable distance between the top of the valve cover and bottom of the overhead, means are provided to permit insertion of the spark plug.

Specifically a long hollow sleeve 51, having a hexagonally shaped lower end is provided. The hexagonal shape conforms to the hexagonal upper end of the spark plug. To install the spark plug, the spark plug wire is first attached to the spark plug. Then the sleeve is fastened onto the spark plug and finally the sleeve and spark plug inserted into the bore in the cylinder overhead. By turning the sleeve, the threads on the lower end of the spark plug will engage the threads in the cylinder overhead bore.

A plurality of grooves 52, 53 and 54 are machined around the circumference of the portion of the cylinder overhead which enters into the cavity 24. Oil lubricating ring 55, and compression rings 56 and 57 are positioned in these grooves 52, 53 and 54, respectively, to provide a typical lubricating and combustion sealing. However, whereas in the prior art the rings were on the outside of the piston providing a sealing effect between the piston and the cylinder wall, in the present invention the sealing is between the cylinder overhead and the cavity 24 in the piston head. Becase of this, the engine block has to be higher than the conventional block, by an amount equal to the length of the stroke.

Adjacent the upper end 20 of the piston head, two holes are bored through the cylinder overhead as at 58 and 60. These are vent holes as will be explained hereinafter.

An important design criterion involves the depth of penetration of the cylinder overhead into the cavity 24, the depth of the cavity 24 and the length of the piston stroke. These three factors must be suitably adjusted relative to each other so that on a full piston stroke the top of the piston head 20 remains at or above the top compression ring 56 and 57.

The operation of the piston of the present invention in the context of a four cycle engine will now be explained. On the intake stroke, intake valve 44 is opened, the piston 10 moves downwardly and gas enters the combustion cavity 24. The combustion cavity is defined by the configuration of the piston head 24 which is concave in configuration and the substantially flat combustion surface 42 of the cylinder overhead. During the down stroke of the piston on the intake cycle, a partial vacuum would ordinarily be created above the upper end 20 of the piston which would reduce engine efficiency. To overcome any such partial vacuum the holes 58 and 60 permit air to enter into this area.

On the second or compression stroke, valve 44 is closed and the piston moves upwardly thereby compressing the gas within the combustion cavity 24.

On the third or power stroke, the gas is combusted by a suitable spark through the spark plug 50. The pressure of the gas is exerted on the concave surface 24 of the piston head thereby urging the piston head and piston downwardly. As the piston moves downwardly relative to the combustion surface 42, the pressure per square inch decreases. However, the total surface of the concave piston head exposed to the gas increases while the combustion surface 42 of the cylinder head remains constant. This increasing percentage of surface area of the piston head serves to reduce the deleterious effect of the drop in pressure per square inch thereby providing more power and greater efficiency. This even further increases the efficiency of the present internal combustion engine since there is a minimum surface area (42) for lost energy (pressure not doing work).

On the fourth or exhaust stroke, as the piston moves upwardly the exhaust valve 46 opens permitting the gases to be exhausted upwardly as is also conventional.

The foregoing is a complete description of a preferred embodiment of the present invention. Many changes may be made without departing from the spirit and scope of the present invention.

What is claimed is:

1. An improved combustion chamber for an internal combustion engine or the like of the conventional type having pistons reciprocally mounted within a cylinder in a cylinder block and having a cylinder head positioned above the cylinder block, the improvement comprising:

said piston having a continuously curved concave piston head extending from an upper first end of the piston downwardly and inwardly toward the piston second end and defining a continuously curved cavity therein starting from said upper first end adajcent to the outer periphery of said piston, said cylinder head extending downwardly into said cavity; said cylinder head being generally convex with a truncated end;

said cylinder head providing a constant stationary surface area upon which non-working energy is dissipated upon combustion of gases in said cavity, and said concave piston head providing a moving and increasing surface area upon which combustion forces are exerted for moving said piston;

said continuously curved piston head cavity and the extent of reciprocation of said piston cooperating to avoid combustion forces being exerted on the cylinder block.

2. An improved combustion chamber for an internal combustion engine or the like of the conventional type having pistons reciprocally mounted within a cylinder in a cylinder block and having a cylinder overhead positioned above the cylinder block, the improvement comprising:

said piston having a continuously curved concave piston head extending from an upper first end of the piston downwardly and inwardly toward the piston second end and defining a continuously curved cavity therein starting from said upper first end adajcent to the outer periphery of said piston;

said cylinder overhead extending downwardly into said cavity, said cylinder overhead being generally convex with a truncated end;

the extent of reciprocation of said piston being limited, and the configuration of the concave piston head cavity and the generally convex overhead all cooperating, upon combustion of gases in said cavity, with the expanding combusted gases for exerting force only on the piston head and on the cylinder overhead during the movement of the piston;

said force for moving the piston away from the cylinder overhead;

said continuously curved piston head for avoiding any of the expanding gases exerting force on said cavity normal to the direction of piston reciprocation.

3. The invention as defined in claim 2 wherein said cylinder overhead has at least two compression rings mounted thereon in contact with the concave surface of the piston head.

4. The invention as defined in claim 2 and further including vent holes through said cylinder overhead in communication with the engine block to eliminate any vacuum-like resistance to the movement of said piston.

5. The invention as defined in claim 2 wherein said limited reciprocation of said piston prevents combustion forces from being exerted on the cylinder walls.

* * * * *